United States Patent [19]
Jordan et al.

[11] Patent Number: 6,097,669
[45] Date of Patent: Aug. 1, 2000

[54] WAVELET FILTERING OF SODAR SIGNALS

[76] Inventors: James R. Jordan, 1842 Joliet Way, Boulder, Colo. 80303; Scott William Abbott, P.O. Box 1038, Nederland, Colo. 80466; Brian D. Templeman, 8172 Orlando Way, Arvada, Colo. 80005

[21] Appl. No.: 09/345,425

[22] Filed: Jul. 1, 1999

[51] Int. Cl.[7] ............................. G01S 15/00; G01S 13/00
[52] U.S. Cl. .............................. 367/99; 367/87; 367/901; 342/26; 342/159; 342/192
[58] Field of Search ................................ 367/87, 99, 901; 342/22, 26, 159, 192

[56] References Cited

U.S. PATENT DOCUMENTS

| | | | |
|---|---|---|---|
| 3,710,381 | 1/1973 | King et al. .............................. | 482/127 |
| 4,290,066 | 9/1981 | Butler ..................................... | 343/17.1 |
| 5,481,269 | 1/1996 | Imhoff et al. .......................... | 342/159 |
| 5,481,270 | 1/1996 | Urkowitz et al. ...................... | 482/126 |
| 5,592,171 | 1/1997 | Jordan .................................... | 482/127 |

OTHER PUBLICATIONS

NOAA Advanced Real—Time, NOAA Technical Memorandum ERL, ETL–251 by D.W. Gregg and S.W. Abbott, Apr. 1995.

Removing Ground and Intermittent Clutter Contamination from Wind Profiler Signals Using Wavelet Transforms by J.R. Jordan and Richard J. Lataitis, Mar. vol. 14, Journal of Atmospheric And Oceanic Technology, 1280–1297.

*Primary Examiner*—Ian J. Lobo
*Attorney, Agent, or Firm*—Thomas Zack

[57] ABSTRACT

A method for determining Doppler shifts and reflectivity data based on wavelet based sodars. Initially, a high powered sodar pulse of sound is transmitted from an antenna into the atmosphere. This pulse of sound consists of a string of concatenated wavelets. The reflected portion of this transmitted pulse is received, amplified and digitized as a string of samples of time correspond to the range of transmission. After sampling for a short time interval to cover the maximum range of sound, the sampled time series is divided into range gates. For Doppler shifts the power spectrum of the sampled time series is calculated and a peak surrounding the frequency of the transmitted sound is observed. From this peak the direction and velocity of the atmosphere at a given attitude is derived. To accurately arrive at a better velocity resolution, replication is used with wavelet coefficients and an inverse wavelet transform.

3 Claims, 10 Drawing Sheets

| WAVELET LEVEL | TRANSMIT FREQUENCY (HZ) |
|---|---|
| -1 | - |
| 0 | - |
| 1 | 21.5 |
| 2 | 43.1 |
| 3 | 86.1 |
| 4 | 172.3 |
| 5 | 344.5 |
| 6 | 689.1 |
| 7 | 1378.1 |
| 8 | 2756.3 |
| 9 | 5512.5 |
| 10 | 11025 |
| 11 | 22050 |

FIG. 5

| WAVELET LEVEL | PASSBAND - 1378 | BANDWIDTH (HZ) |
|---|---|---|
| -1 | - | - |
| 0 | - | - |
| 1 | 43.1 - 21.5 | 21.5 |
| 2 | 86.1 - 43.1 | 43.1 |
| 3 | 172.3 - 86.1 | 86.1 |
| 4 | 344.5 - 172.3 | 172.3 |
| 5 | 689.1 - 344.5 | 344.5 |
| 6 | 1378.1 - 689.1 | 689.1 |

FIG. 6

WAVELET FILTERING OF SODAR SIGNALS

BACKGROUND OF THE INVENTION

Sodars are a type of radar that transmit sound instead of microwaves. When such sound based radars are used in the atmosphere they are generally referred to as "sodars" and "sonars" when used in water. As used in this specification the term "sodar" applies to both mediums, atmosphere and water, and relates to a process of using wavelet filtering of sound based signals to remove echoes and external sound sources. In addition, the processed signals are compressed to reduce the storage requirements for the sodar records.

When used in the atmosphere, sodars provide information about the winds and structure. Winds are measured using the Doppler shift of the sound that has reflected from temperature gradients in the atmosphere. The structure of temperature inversions in the atmosphere is derived from the amplitude of the signal that was reflected from the inversions, called the reflectivity. Thus, both Doppler and reflectivity data for wavelet based sodar are covered by the this invention all as will be described in detail hereafter.

DESCRIPTION OF THE PRIOR ART

Sodar and sonar based devices and the related treatment and processing of the associated signals are known. The present invention is essentially described in a National Oceanic And Atmospheric Administration (NOAA) paper entitled "Wavelet Filtering of Sodar Signals" which was first given at the 9th International Symposium on Acoustic Remote Sensing and Associated Techniques of the Atmosphere and Oceans in Vienna, Austria on Jul. 6–10, 1998.

In the NOAA Technical Memorandum ERL ETL-251 entitled "NOAA ADVANCED REAL-TIME DIGITAL SODAR" dated April 1995, a sodar Doppler processing procedure is described where the sampled return signal is converted into a long power spectrum and the points around the transmit frequency are used to to determine the Doppler shift. Still another NOAA originated paper entitled "REMOVING GROUND AND INTERMITTENT CLUTTER CONTAMINATION FROM WIND PROFILER SIGNALS USING WAVELET TRANSFORMS", Volume 14, pages 1280–1297 of the Journal Of Atmospheric And Oceanic Technology" (August 1996) and the related U.S. Pat. No. 5,592,171 to Jordan discloses the use of wavelet transforms to reduce clutter contamination in wind profiling radars.

The derivation of a matched filter receiver is described by M. I. Skolnik in *Introduction to Radar Systems,* dated 1980 from McGraw Hill, 477 pages. Wavelet transforms as filters is described by T. K. Sarkar et. al. In "A Tutorial on Wavelets from an Electrical Engineering Perspective, Part 1: Discrete Wavelet Techniques", IEEE Antennas and Propagation Magazine, October 1998.

Patented inventions that disclose the improved processing of transmitted waves exist. For example, in U.S. Pat. No. 3,710,381 to King et al. a signal to noise detector is disclosed which samples noise over the entire pass band of the tracker input except for a range of frequencies above and below the tracking frequencies, which prevent the system from locking onto a side lobe or image return.

U.S. Pat. No. 4,290,066 to Butler discloses a method for eliminating the effects of clutter in a coherent pulsed Doppler radar by determining the center frequency of the clutter and periodically moving the local oscillator frequency so the clutter is shifted out of the Doppler filter passband.

U.S. Pat. No. 5,481,270 to Urkowitz et al. discloses a method of identifying a remote target by generating echo signals, receiving the signals representing the target, noise and clutter. The received signals are passed through a plurality of cascaded channels with range sidelobe suppression and narrow band filtering to eliminate noise and clutter.

SUMMARY OF THE INVENTION

This invention relates to a wavelet based sodar process that can be used with both Doppler and reflectivity data. The particular wavelet based process used removes echoes from fixed targets and external sound sources from the sodar signals while providing maximum sensitivity to desired signals.

It is the primary object of the present invention to provide for an improved process for treating wavelet based sodar signals and related Doppler shift and reflectivity data.

Another object is to provide for such a process wherein a string of concatenated wavelets from an antenna are reflected back towards the antenna and reflectivity data Doppler shift data used to derive useful data results.

These and other objects and advantages of the present invention will become apparent to readers from a consideration of the ensuing description and the accompanying drawings.

BRIEF DESCRIPTION OF THE DRAWINGS

FIG. 5 is a table of fundamental transmit frequencies possible with each wavelet level for a 44.1 kHz sampling frequency.

FIG. 6 is a table of the bandpass characteristics of the second-stage, 128 point DWT.

DESCRIPTION OF THE PREFERRED EMBODIMENT

Figure 1:
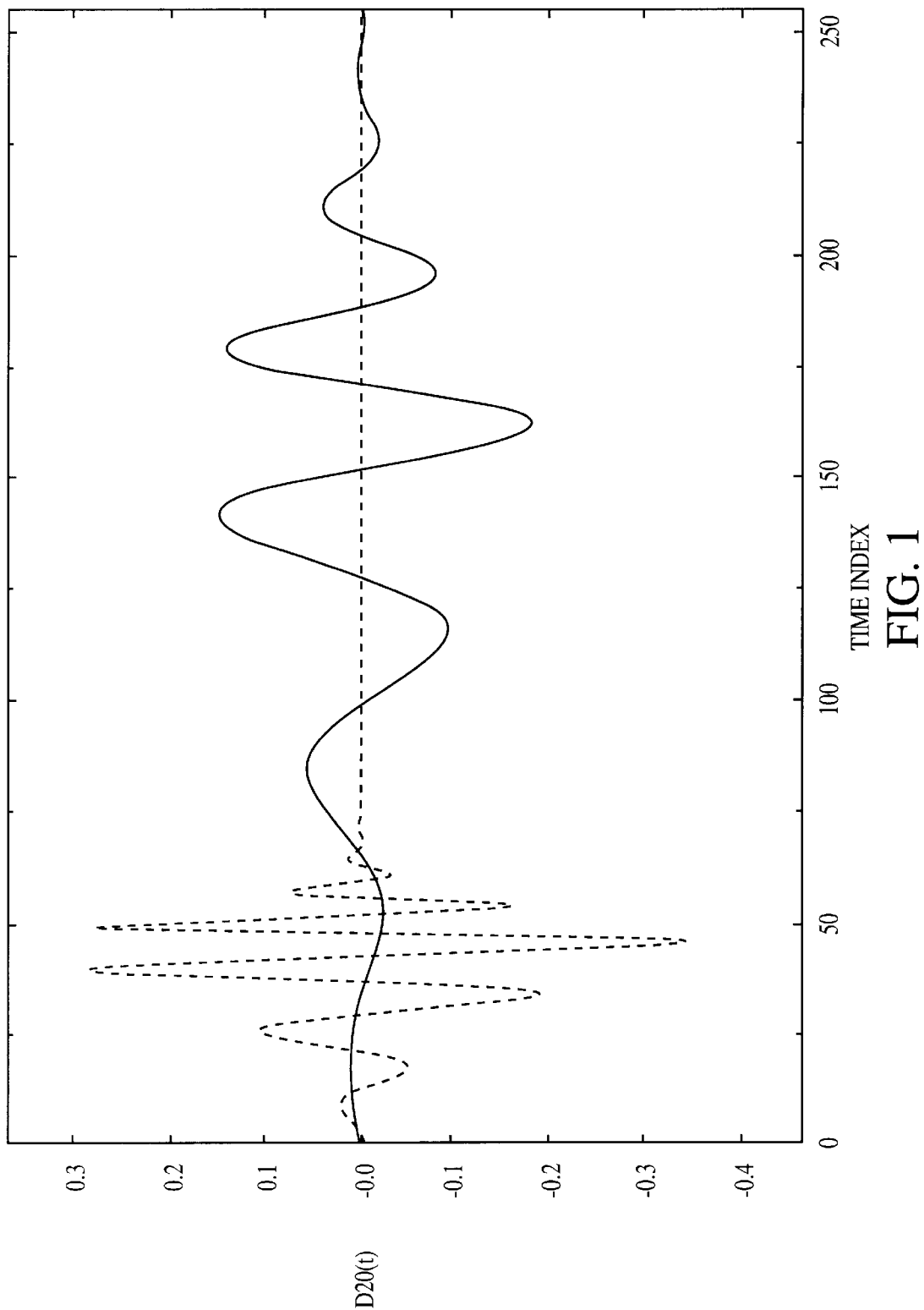
FIG. 1 is a Daubechies wavelet for two different scales and positions used with the invention.

FIG. 1 is a plot of the Daubechies 20 wavelet for two different scales and positions used with the invention. As referenced in the cited publication "Wavelet Filtering of Sodar Signals" authored by James R. Jordan et al., the decomposition of a signal into local basis functions called wavelets is the subject of intense interest. Wavelets are a waveform of effectively limited duration that have an average value of zero. Compared to smooth and predictable sinusoids, the basis for Fourier analysis, wavelets tend to be irregular and asymmetric. Wavelet analysis is the breaking up of a signal into shifted and scaled versions of the original or mother wavelet. Since the wavelets have limited temporal extent, unlike Fourier transforms, wavelets can resolve isolated features in a time series (or range for sodar signals). Fourier transforms are expressed in terms of frequency, while a wavelet transform is expressed in terms of scale and position. The largest scales are analogous to low frequencies, and the smaller scales contain the high frequency information. Wavelet transforms, like Fourier transforms, may be defined in terms of both continuous and discrete representations.

The discrete wavelet transform (DWT) is an efficient way to implement the decomposition as a real time filter. It expresses a function in terms of a finite number of shifted and scaled mother wavelets (called daughter wavelets). Each group of coefficients at a given scale is often referred to as a "level" of daughter wavelets. For a time series of length 2n, there are j=n-1 levels. Each level j corresponds to 2j daughter wavelets shifted by 2-j units spanning the time series series (reference "An Introduction to Random Vibrations, Spectral and Wavelet Analysis, D. E. Newland, 1993, Longman Scientific and Technical, 477 pp.) By taking advantage of scales and positions bases on powers of two, called dyadic scales and positions, the discrete wavelet transform provides an accurate decomposition of the signal with a minimum of calculations.

Figure 2:
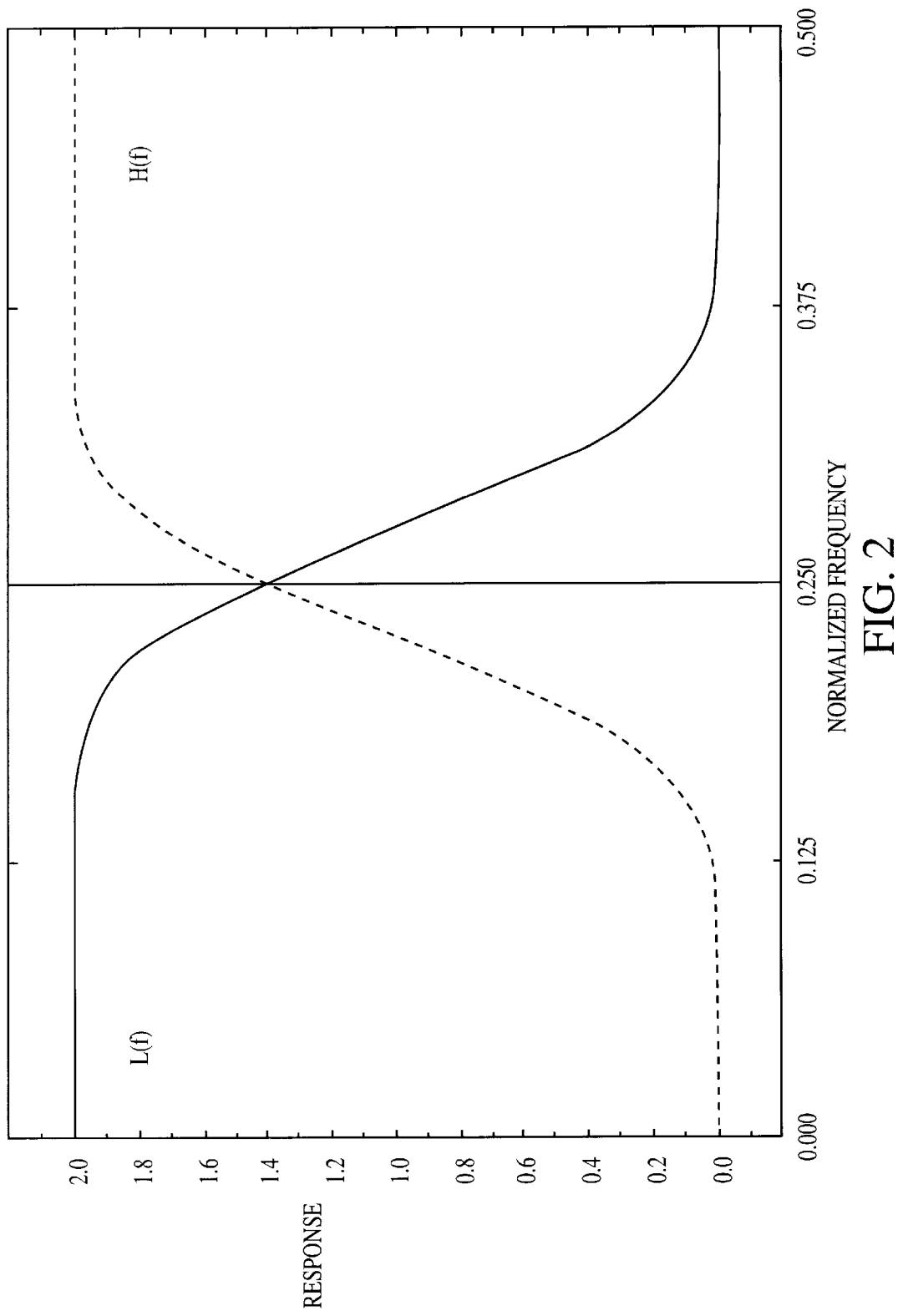
FIG. 2 is the low and high-pass components of the quadrature mirror filter response for a Daubechies 20 wavelet.

The wavelet transform can also be explained in terms of a repeated application of quadrature mirror filters (QMFs) (Sarkar, 1998). This description is helpful in understanding the filtering of sodar signals discussed here. Consider a 128-point DWT. The j=6 level corresponds to wavelet coefficients w64–w123, which describe the small scale structure of the signal f. The coefficients w0–w63 correspond to levels j=−1 to 5 and describe the large scale structure of the signal. Note that the j=6 level, and the levels j=−1 to 5 combined, contain 64 points each. If we reconstruct the signal associated with each half of the full DWT, we would generate high- and low-pass filtered versions of the original signal, each containing half of the points in the original signal. Therefore, the application of a DWT can be described in terms of a simultaneous low- and high-pass filtering of the original signal (i.e., a passing of the signal through QMFs), with a subsequent decimation or down-sampling (by a factor of two) of the resulting time series. The low- and high-pass versions of the original signal are typically referred to as the "approximation" and the "details," respectively. The frequency response of the QMFs is determined by the form of the mother wavelet, with the corresponding bandwidth determined by the extent of the daughter wavelet associated with the level of interest (in this case level j=6). An example of the "universal" QMF frequency response for a Daubechies 20 wavelet is shown in FIG. 2. The solid curve is the lowpass response and the dashed line the highpass response. We would like the two responses to be non-overlapping, however, due to realizability conditions, they are like those presented in FIG. 2. QMFs can be applied repeatedly to generate the full wavelet decomposition. We note that the process can be reversed and the original signal reconstructed by up-sampling and filtering by so-called reconstruction filters. This process is described by Sarkar et. al (1998) and will not be presented here.

Figure 3:
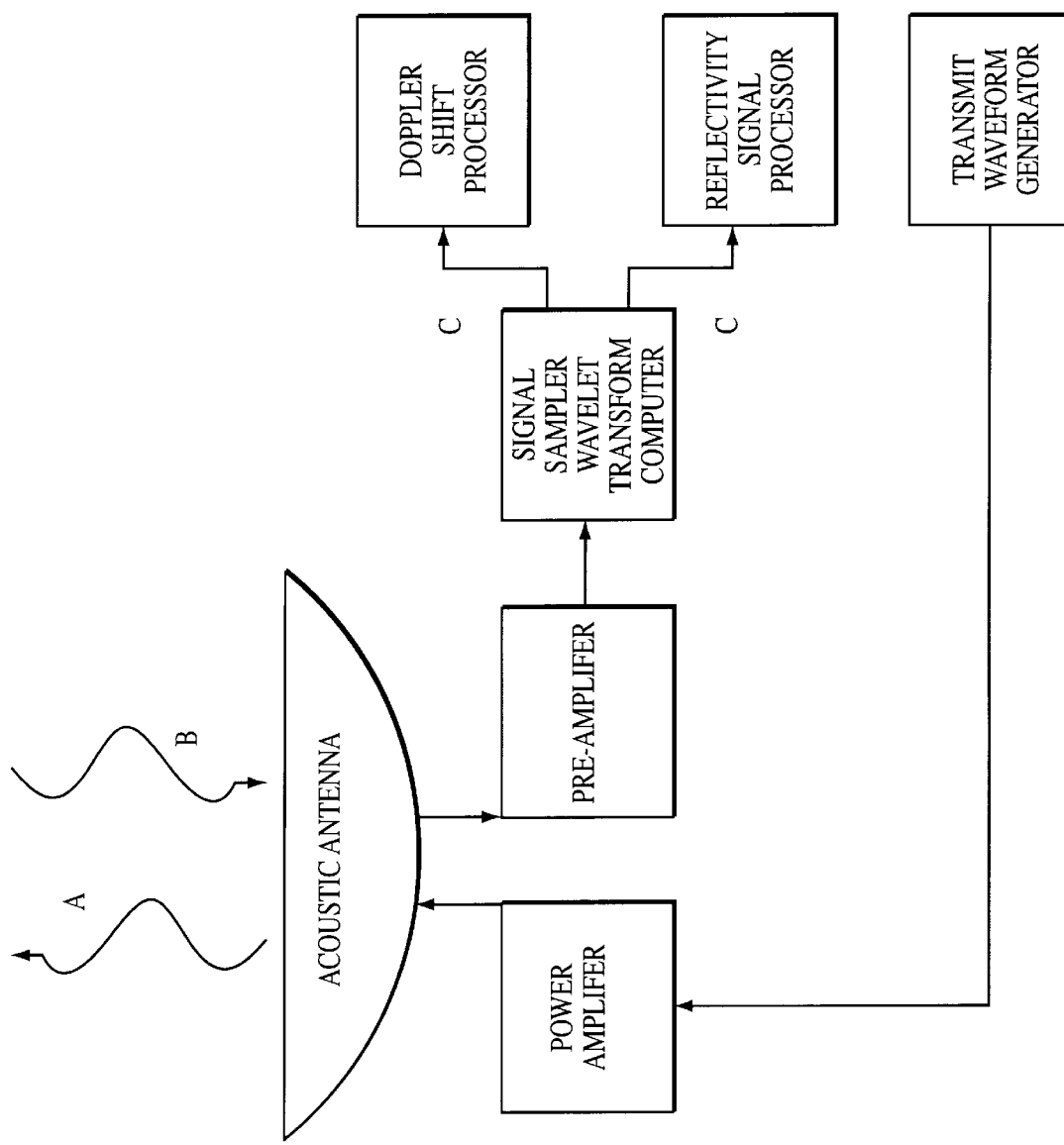
FIG. 3 is a schematic block diagram for the basic hardware set up used to practice the present invention.
Figure 4:
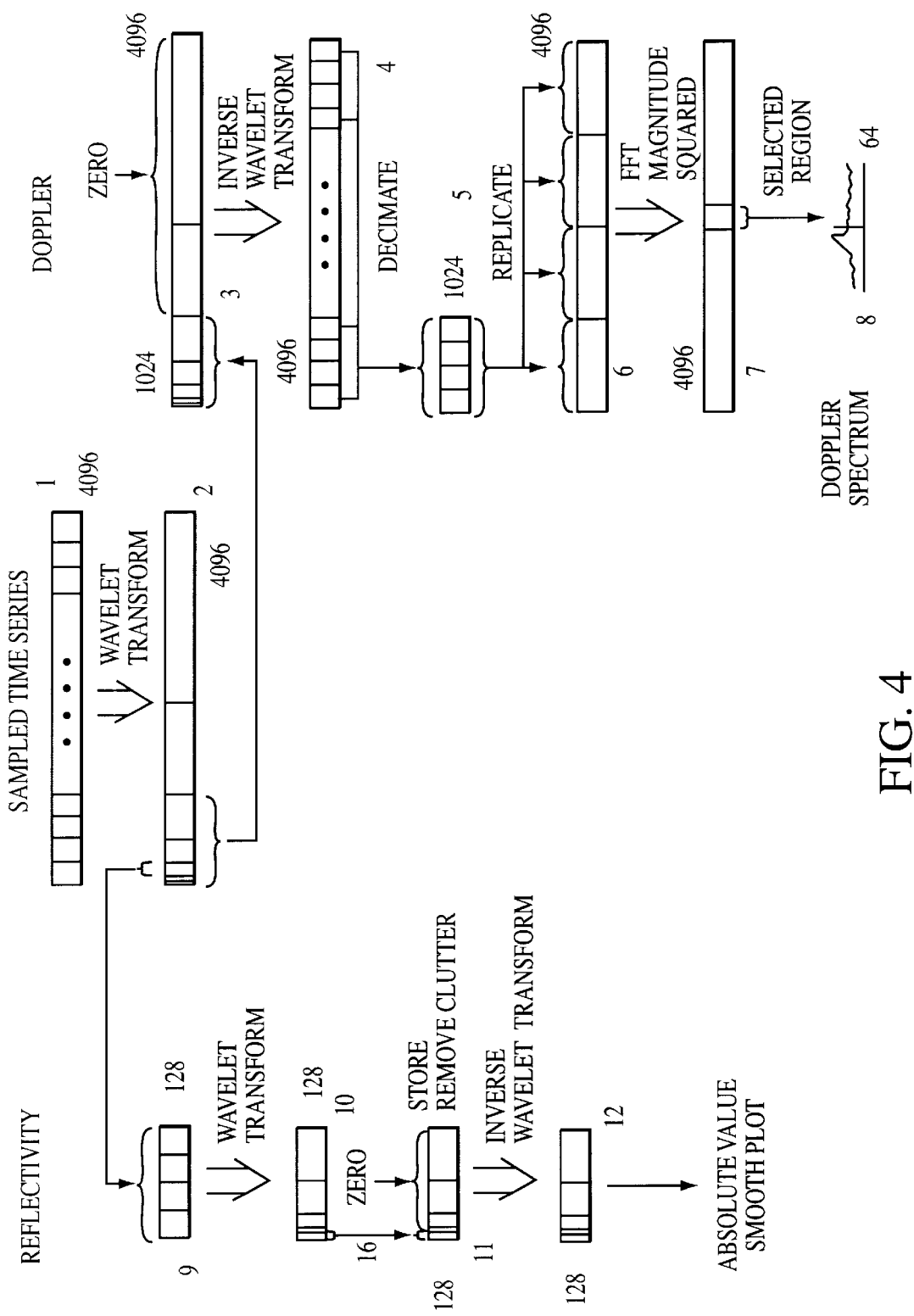
FIG. 4 is a diagram of how the Doppler and reflectivity data used in FIG. 3 are processed within a computer.

FIG. 1 is a plot of the Daubechies wavelet (D20) for two different scales and positions. It was chosen because it is a good compromise for resolving features in both time and scale. FIG. 3 is a schematic block diagram for the basic hardware set up used to practice the present invention. All of the hardware used, unless indicated otherwise, is conventional off-the-shelf instrumention. Initially a sodar signal A made up of a string of concatenated wavelets is transmitted from an acoustic antenna. Signal A consists of a high powered pulse of sound as described with respect to FIG. 5. Some of the sound A transmitted into the atmosphere is reflected back towards the antenna as designated by the wave signal B. The received signal B is electronically amplified and digitized as a string of samples in time corresponding to range. A personal computer (PC) running windows NT (Network software) may be used with a sound card such as Montego Model A3DXPCI. One off-the-shelf high power Power Amplifier that has been used to transmit the initial sodar wave is a Crown (Crown International, Inc.) Model 450, Elkhart, Ind. Normally this transmitted sound wave is in the frequency range of 1 to 4 kHz (kilohertz). Also connected to the antenna is the low noise pre-amplifier used in the same set up to receive reflected sound signals using the same antenna. With the mentioned instruments, one low noise pre-amplifier used was built in the laboratory as detailed in the NOAA Technical Memorandum ERL ETL-251 by Gregg and Abbott on pages 10–12. The return signals B are sampled about 1 to 5 seconds to cover the maximum range of the transmitted sodar wavelets. After the sampling of the return signals takes place, the wavelet transform of the sampled time series is computed. This results in 4096 wavelet coefficients distributed in 11 levels as represented by the signals C. Each of the levels in signals C correspond to a different scale of information in the data with large scales representing the smooth part of the data and small scales representing details. The wavelet coefficients of signals C are then within the computer separately passed to a Doppler shift processor and a reflectivity signal processor. The radial velocity of the atmosphere is derived from the Doppler shift processor by calculating the power spectrum of the sampled time series and looking for a peak in the portion of the spectrum surrounding the fundamental frequency of the transmitted signal. From the position of the peak, we derive the direction and the velocity of the wind at that attitude. The method used to derive this result is described in the 1995 Gregg and Abbott reference publication, ERL ETL-251 previously discussed above. As described with respect to the FIG. 3, some new steps have been added to the Gregg and Abbott Doppler data processing. FIG. 4 is a more detailed diagram of how the Doppler and reflectivity data used in FIG. 3 are processed within a computer, such as previously mentioned.

The problem with the current Doppler technique is velocity resolution. Velocity resolution is a function of the transmitted wavelength, as the wavelength gets longer, the velocity resolution gets larger. The velocity resolution for the example here is 1.4 meters per second (m/s) for each bin the power spectrum. This is too course for useful wind measurements. This invention covers a new idea called replication. The first step begins with the 4096 wavelet coefficients in block 2 of FIG. 4. We set the last two levels of coefficients (points 1024 to 4095) to zero as shown in block 3 of the same figure and compute the inverse wavelet transform. The resulting 4096 point time series (block 4 of FIG. 4) has the high frequency part of the signal removed. We then decimate (i.e., take only every fourth point) the filtered time series by some number of points, e.g. 4 points. Since the filtered time series is so over sampled, we can decimate without ailising problems. This leaves a 1024 point long time series at block 5. Block 6 in the same figure (FIG. 4) shows the 1024 point long time series replicated four times. This step just places the time series end to end four times and makes a new 4096 point time series in block 7. The last step (block 8) is the same as described in the 1995 Gregg and Abbott reference publication, ERL ETL-251 previously discussed above on pages 19 and 20. A 4096 point power spectrum is computed and the part of the spectrum around the transmit frequency is used to find the Doppler shift of the atmosphere. Because of replication, the center frequency has been shifted up by a factor of 4 and the velocity resolution is improved by a factor of 4 to about 0.3 m/sec for each bin.

The signals C are also processed by the reflectivity signal processor within the computer. As outlined in the discussion of FIG. 3, the sampled time series wavelet transform signals C are computed. This results in 4096 wavelet coefficients distributed in 11 levels (see FIG. 4 block 2). Both the Doppler processor and the reflectivity processor start with these 4096 wavelet coefficients. The reflectivity processor follows radar receiver design principles as described in Sknolik, page 369. Wavelet analysis is used to build a reflectivity processor with matched-filter receiver response to maximize the detection sensitivity. Matched-filtering in the sodar is accomplished by a two-stage process. The first stage involves the computation of a discrete wavelet transform (DWT) of the digitized received signal. As further described in with respect to FIG. 4 block 2, the return signal is mostly confined to one level. For example, level 7 shown in the FIG. 5 table with 128 coefficients. These coefficients form a suboptimally filtered time series, the bandwidth is much broader than the desired matched-filter response. To further reduce the bandwidth of the detected signal, a second DWT of these 128 first-stage wavelet coefficients is computed. The bandpass characteristics of this second-stage DWT are presented in FIG. 6. We keep the first 16 second-stage coefficients and the rest of the second-stage coefficients are discarded. These second-stage coefficients are stored in their compressed state. This compressed data can used either real-time or stored data from a disk.

Echoes from fixed targets, such as buildings, generate a return signal that is non-varying, or DC. This DC return is confined to the second-stage wavelet coefficients 0 and 1. It is then possible to remove fixed echoes from the return by setting the second-stage coefficients 0 and 1 to zero as shown in block 11 (FIG. 4).

Figure 7:
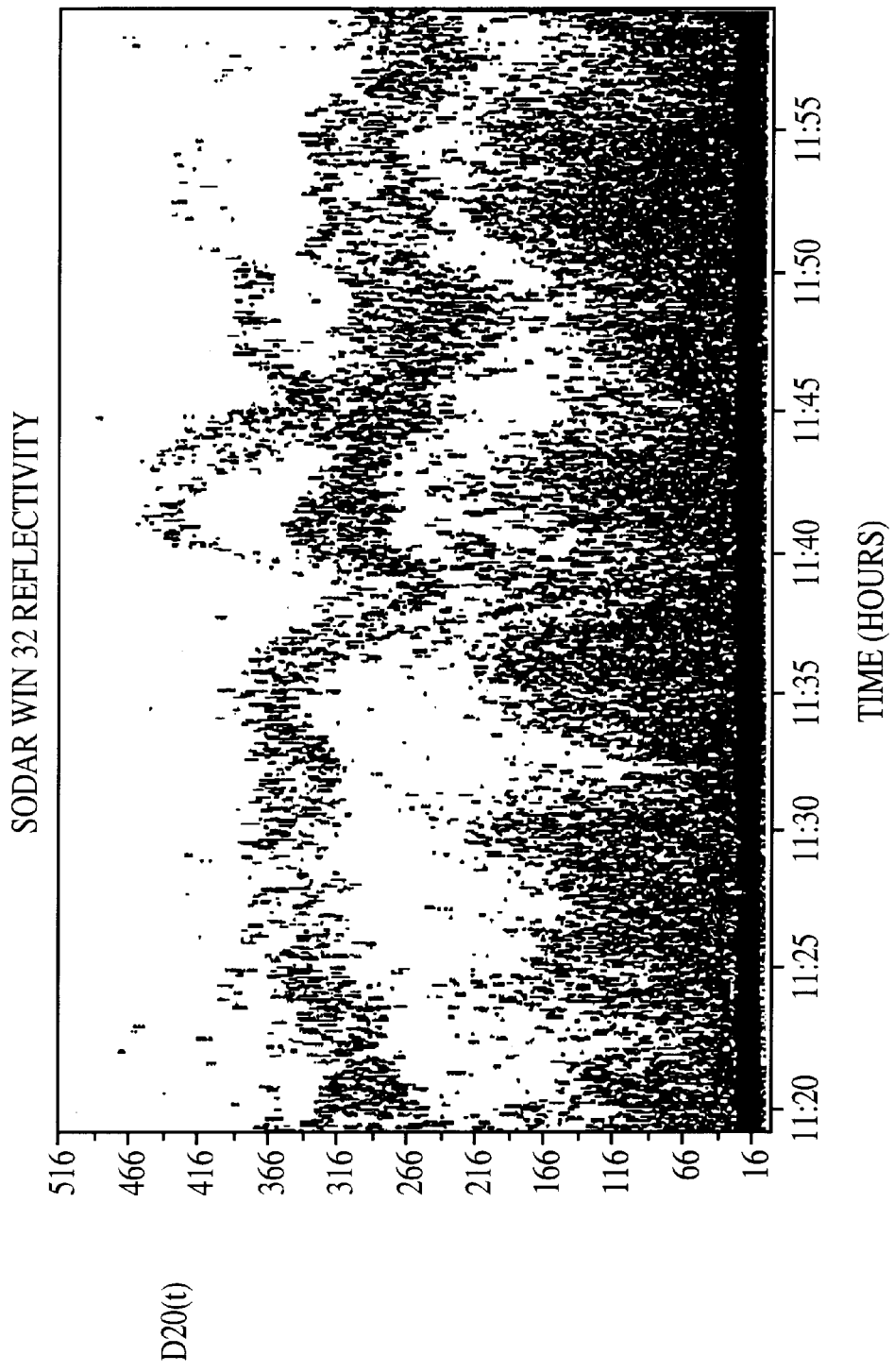
FIG. 7 is a graph of time versus height for the reflectivity processed signals.

The remaining 16 second-stage coefficients are then inverse transformed back to 128 filtered first stage coeffecients in block 12. By computing the absolute value of these first stage coefficients the reflectivity of the atmosphere is obtained. This process is done on each of the 4096 points piece of the entire time series and the resulting values are then smoothed and plotted on a time(hours) versus height (meters) graph as shown in the FIG. 7.

We use a sound card, such as stated above, to generate the transmitted sodar signal as described with respect to FIG. 3 and to digitize the return signal. Using a sound card has three advantages: low cost, high resolution, and high sampling rates. The sound cards also have 16 bit analog-to-digital converters. This large dynamic range (96 decibels) allows the resolution of small atmospheric returns in the presence of large external noise sources. The particular sound card selected used a 44.1-kHz sampling rate which minimizes aliased high frequency noise, improving the detectability of the atmospheric return.

Wavelet coefficients for a given level correspond to consecutively shifted wavelets having the same scale or fundamental frequency. The transmitted signal is generated by setting some number of the wavelet coefficients at one level equal to unity and computing the inverse wavelet transform. The resulting waveform is a nearly sinusoidal pulse, with a length determined by the number of non-zero wavelet coefficients used in the given level. The minimum range resolution is determined by the length * of one wavelet and the maximum resolution is N*. where N is the number of coefficients in the level. The fundamental frequency of the transmitted waveform is fixed by the wavelet level chosen and the sampling frequency (see FIG. 5 table). FIG. 5 lists the fundamental frequency of each possible wavelet level assuming a 44.1 kHz sampling rate and 4096 point wavelet transform. The maximum pulse length (all the coefficients in the level set to unity) for these parameters is the same for any selected level, and is 931 milliseconds long or about 16 m(meters) in range.

Transmitting a concatenated string of wavelets creates received signals from the clear air and fixed targets that are highly correlated with the transmitted wavelet. The corresponding wavelet transform contains large coefficients in the wavelet domain at only one primary level (i.e., the same level as the transmitted signal). External and electronic noise generated coefficients at many levels and much of their energy can easily be removed.

Figure 8:
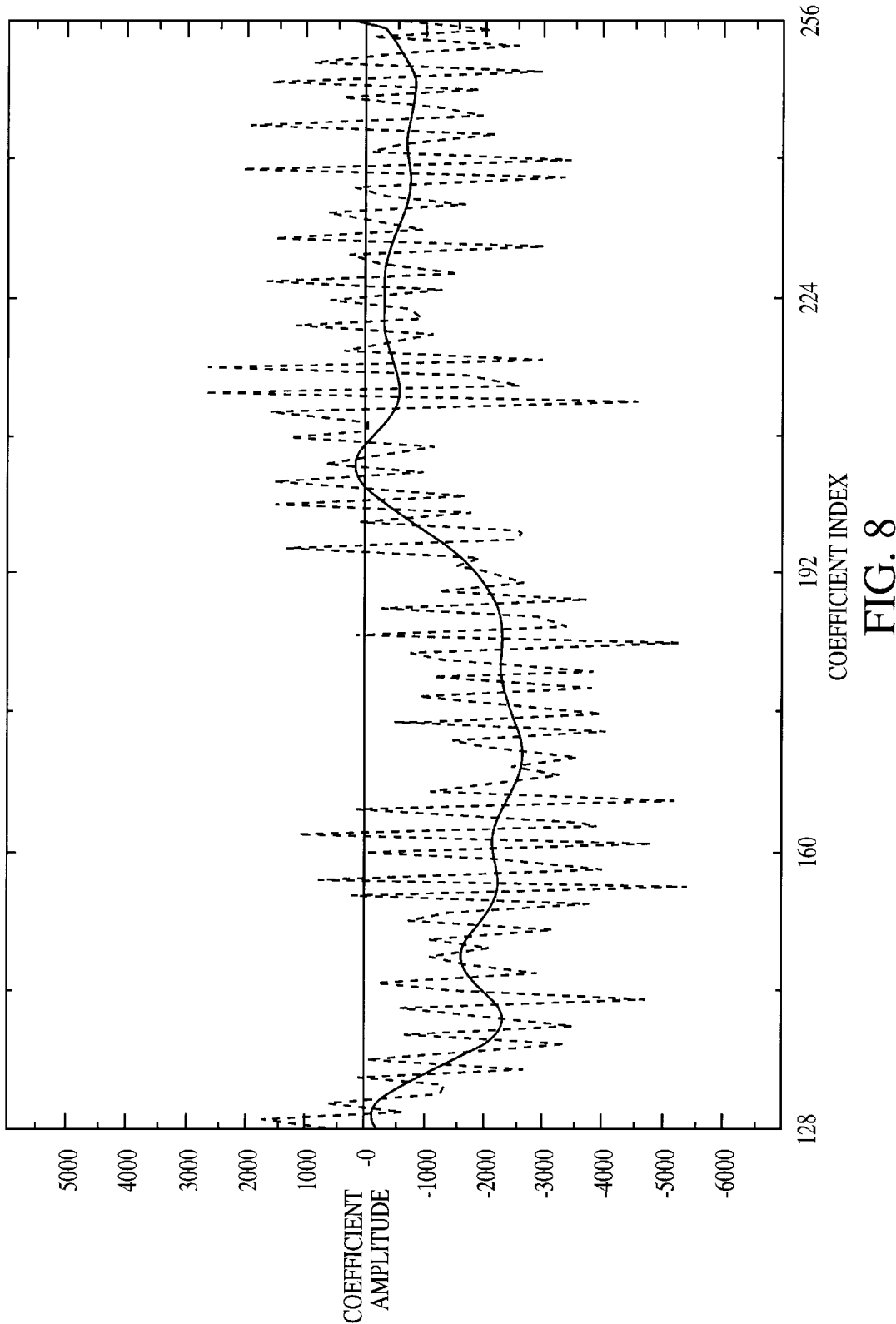
FIG. 8 is a graph of the computed wavelet transform with and without small scale coefficients removed.

Level-7 coefficients of a measured sodar return containing 4096 time samples (corresponding to 16 meters in range) are shown in FIG. 8. The dotted line in this figure is the wavelet coefficients containing a tower reflection. The level shift in these coefficients is due to the reflected energy, higher frequency coefficients are due to noise. The solid line contains the large scale coefficients of the signal after the noise has been removed by the second stage wavelet transform. Reflections from fixed targets (as in FIG. 8) are received as scaled copies of the transmitted signal. Reflections from the atmosphere are not coherent for the entire pulse length. Therefore, we remove large scale offsets in the wavelet coefficients by setting the first two coefficients (the largest scales) equal to zero before the inverse transform. This removes most of the return from fixed targets, but has minimum effect on the atmospheric return.

Figure 9:
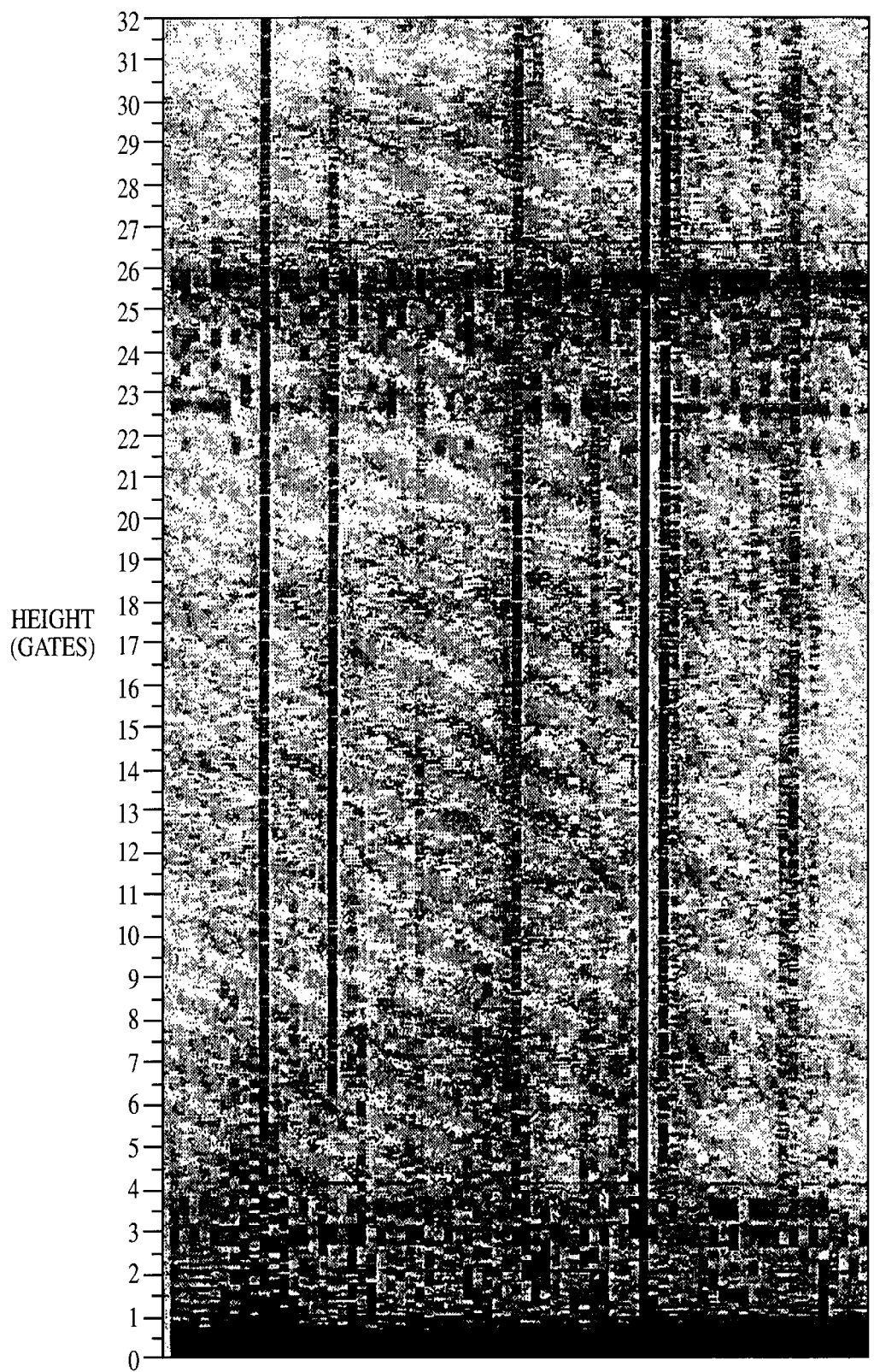
FIG. 9 is an example of a FAX record without wavelet filtering.

FIG. 9 is an example of a FAX record without wavelet filtering. In the experiment the sodar antenna was tipped 30 degrees from the zenith and aimed at a tower. There are reflections from the tower between range gate 21 and gate 25 and reflections from buildings at range gates 2 and 3. Evident as horizontal lines in the record (one range gate is 16 meters). Also, shown are vertical lines from airplanes and cars nearby. There also are clear air return from thermal plumes.

Figure 10:
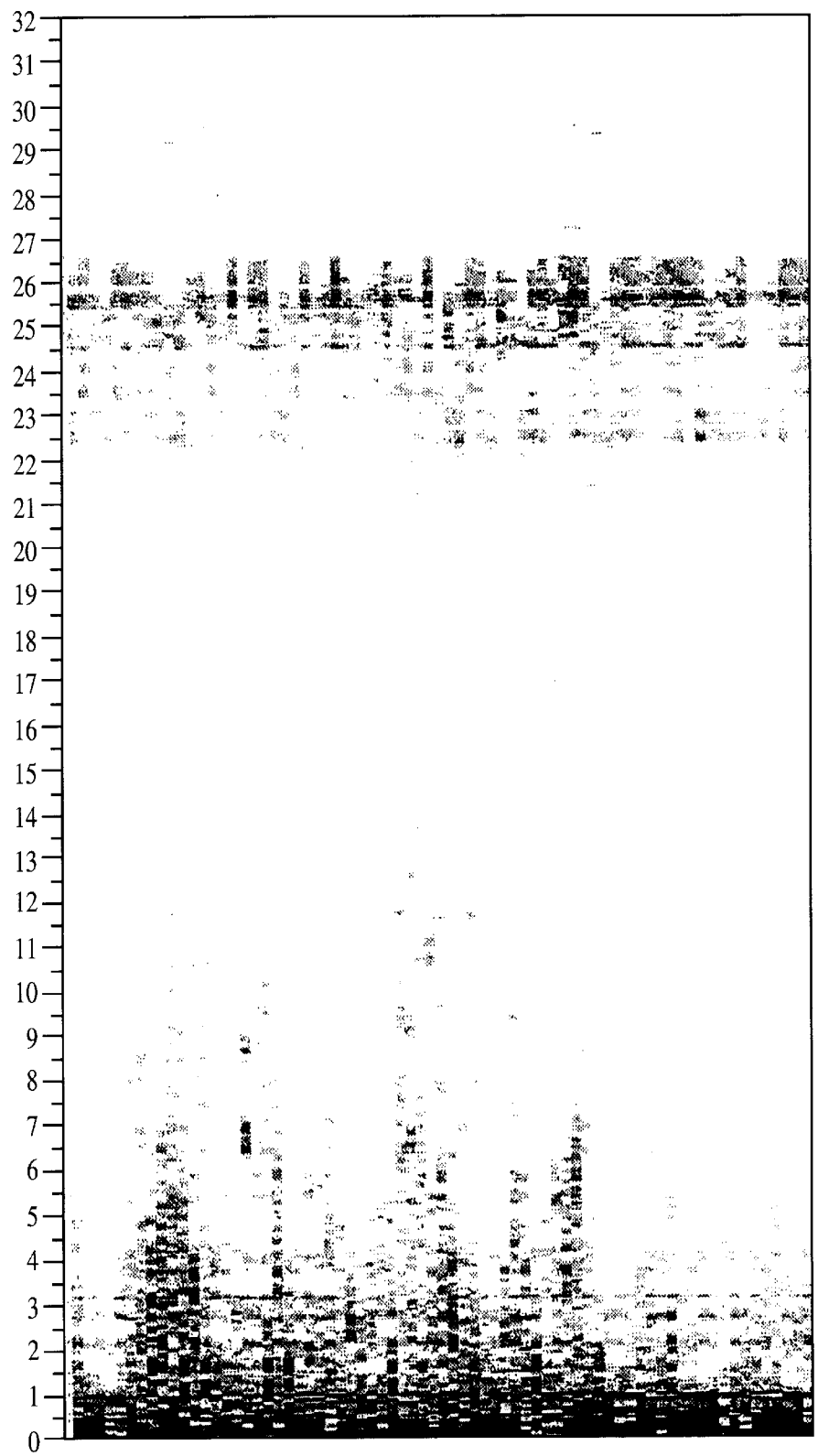
FIG. 10 is an example of a FAX record after wavelet filtering.

FIG. 10 is an example of a FAX record after wavelet filtering. It is based on the same data as in FIG. 9 after wavelet filtering. The external noise has been removed along with most of the tower return, but the clear-air return has been preserved.

As described, the present invention uses a wavelet-based filter for removing external noise and reflections from fixed targets from sodar FAX records and for improving the velocity resolution of wind measurements. In the invention, a pulse of concatenated wavelets are transmitted and the wavelet transform of the received signal is taken. The back scattered signal is highly correlated with the wavelet. This causes the received energy to be concentrated into one level of the wavelet transform and noise to be distributed throughout the transform. Further filtering is accomplished by taking the wavelet transform of the wavelet coefficients where the received energy is concentrated. Additionally, the filtered time series can be recorded by only storing a few wavelet coefficients resulting in a compression ratio of 256.

Using the wavelet to filter high frequency energy from the time series, the present invention allows the sampled time series to be replicated some number of times to increase the velocity resolution of the Doppler measurements.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What we claim as our invention is:

1. A method for the wavelet filtering of sodar signals comprising the steps of:

(a) using a transmitter to transmit a pulse of sound waves consisting of a string of concatenated wavelets;

(b) receiving a reflected portion of the transmitted sound waves in step (a);

(c) amplifying and digitizing the received reflected pulses in step (b) for a predetermined time interval and converting the result into a string of signals;

(d) dividing the string of signals in step (c) into range gates corresponding to fixed range distances from the transmitter in step (a) to form a wavelet transform with wavelet coefficients;

(e) taking a wavelet transform of one level of step (d) to arrive at second order coefficients of a fixed number and discarding any coefficients not of the fixed number;

(f) electronically storing the fixed number of coefficient of step (e) on a storage media; and (g) inverse wavelet transforming the fixed number of coefficients of step (f) and computing the absolute value of these coefficients to arrive at a plot representative of the reflectivity of the transmitted pulse of sound waves in step (a).

2. A method for the wavelet filtering of sodar signals comprising the steps of:

(a) using a transmitter to transmit a pulse of sound waves consisting of a string of concatenated wavelets;

(b) receiving a reflected portion of the transmitted sound waves in step (a);

(c) amplifying and digitizing the received reflected pulses in step (b) for a predetermined time interval and converting the result into a string of signals;

(d) dividing the string of signals in step (c) into range gates corresponding to fixed range distances from the transmitter in step (a) to form a wavelet transform with wavelet coefficients;

(e) taking a wavelet transform of one level of step (d) to arrive at second order coefficients of a fixed number and discarding any coefficients not of the fixed number;

(f) electronically storing the fixed number of coefficient of step (e) on a storage media;

(g) setting second order coefficients 0 and 1 of step (e) to zero to remove echos from fixed targets; and (h) inverse wavelet transforming the modified coefficients of step (g) and computing the absolute value of these coefficients to arrive at a plot representative of the reflectivity of the transmitted pulse of sound waves in step (a).

3. A method for the wavelet filtering of sodar signals comprising the steps of:

(a) using a transmitter to transmit a pulse of sound waves consisting of a string of concatenated wavelets;

(b) receiving a reflected portion of the transmitted sound waves in step (a);

(c) amplifying and digitizing the received reflected pulses in step (b) for a predetermined time interval and converting the result into a string of signals;

(d) dividing the string of signals in step (c) into range gates corresponding to fixed range distances from the transmitter in step (a) to form a wavelet transform with wavelet coefficients;

(e) filtering the resultant string of signals in step (d) by setting the small scale wavelet coefficients to zero and computing the inverse wavelet transform of the remaining coefficients;

(f) decimating the resulting string of signals in (e) by some number;

(g) replicating the string of signals in (f) by some number;

(h) calculating the power spectrum from the signal in step (g) to arrive at peak for the portion of the spectrum surround the frequency of the transmitted signal; and (i) using the arrived at peak of step (h) to derive the direction and velocity of the atmosphere at a given attitude.

* * * * *